US012047648B2

(12) United States Patent
 Quach (10) Patent No.: US 12,047,648 B2
(45) Date of Patent: Jul. 23, 2024

(54) SYSTEMS AND METHODS FOR MIDSTREAM SELECTION OF CONTENT TO INSERT INTO A MEDIA STREAM

(71) Applicant: Akamai Technologies Inc., Cambridge, MA (US)

(72) Inventor: Hau Dang Quang Quach, Union City, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 314 days.

(21) Appl. No.: 16/935,146

(22) Filed: Jul. 21, 2020

(65) Prior Publication Data

US 2022/0030315 A1    Jan. 27, 2022

(51) Int. Cl.
| | |
|---|---|
| H04N 21/47 | (2011.01) |
| H04N 21/234 | (2011.01) |
| H04N 21/236 | (2011.01) |
| H04N 21/472 | (2011.01) |
| H04N 21/845 | (2011.01) |

(52) U.S. Cl.
CPC .  H04N 21/47202 (2013.01); H04N 21/23424 (2013.01); H04N 21/236 (2013.01); H04N 21/8456 (2013.01)

(58) Field of Classification Search
CPC .............................. H04N 21/235; H04N 21/20
See application file for complete search history.

(56) References Cited

U.S. PATENT DOCUMENTS

| | | | |
|---|---|---|---|
| 6,108,703 | A | 8/2000 | Leighton et al. |
| 7,058,706 | B1 | 6/2006 | Iyer et al. |
| 7,096,263 | B2 | 8/2006 | Leighton et al. |
| 7,096,266 | B2 | 8/2006 | Lewin et al. |
| 7,200,681 | B1 | 4/2007 | Tsimelzon et al. |
| 7,240,100 | B1 | 7/2007 | Wein et al. |
| 7,251,688 | B2 | 7/2007 | Leighton et al. |
| 7,274,658 | B2 | 9/2007 | Bornstein et al. |
| 7,293,093 | B2 | 11/2007 | Leighton et al. |
| 7,484,002 | B2 | 1/2009 | Swildens et al. |
| 7,523,181 | B2 | 4/2009 | Swildens et al. |
| 7,574,499 | B1 | 8/2009 | Swildens et al. |
| 7,603,439 | B2 | 10/2009 | Dilley et al. |
| 7,716,367 | B1 | 5/2010 | Leighton et al. |
| 7,725,602 | B2 | 5/2010 | Liu et al. |

(Continued)

OTHER PUBLICATIONS

PCT/International Search Report for PCT application US2021/070901, related to current application, mailed on Nov. 17, 2021, 4 pages.

(Continued)

*Primary Examiner* — Mushfikh I Alam (57) ABSTRACT

An index file for an on-demand media stream (such as video-on-demand) is analyzed to determine one or more content insertion points, also referred to as cue points. The streaming platform modifies the index file such that the streaming platform can select the content to insert later on, preferably making that selection after the index file has been served and preferably a short time before the cue point in the stream. Put another way, the decision as to which content to insert at such points is not predetermined at the time of serving the index file. In this way, content insertions decisions can be made midstream.

16 Claims, 8 Drawing Sheets

(56) References Cited

U.S. PATENT DOCUMENTS

| | | | |
|---|---|---|---|
| 7,752,258 | B2 | 7/2010 | Lewin et al. |
| 7,912,978 | B2 | 3/2011 | Swildens et al. |
| 7,925,713 | B1 | 4/2011 | Day et al. |
| 7,996,531 | B2 | 8/2011 | Freedman |
| 8,195,831 | B2 | 6/2012 | Swildens et al. |
| 8,543,667 | B2 | 9/2013 | Hluchyj et al. |
| 8,880,633 | B2 | 11/2014 | Brookins et al. |
| 8,954,596 | B2 * | 2/2015 | Ronca .............. H04N 21/47202 709/233 |
| 8,972,461 | B2 | 3/2015 | Lewin et al. |
| 9,923,945 | B2 * | 3/2018 | Viveganandhan ......................... H04N 21/2387 |
| 10,410,222 | B2 | 9/2019 | Brueck et al. |
| 10,999,395 | B2 | 5/2021 | Patil |
| 11,523,144 | B2 * | 12/2022 | Sugimoto ............... G06T 19/00 |
| 2008/0275955 | A1 * | 11/2008 | Yamazaki ............... H04L 67/54 709/205 |
| 2009/0006643 | A1 * | 1/2009 | Lee ...................... H04L 65/605 709/231 |
| 2010/0175079 | A1 | 7/2010 | Braun et al. |
| 2012/0124618 | A1 | 5/2012 | Ruiz-Velasco et al. |
| 2012/0167132 | A1 * | 6/2012 | Mathews ............. H04N 21/812 725/32 |
| 2015/0033023 | A1 * | 1/2015 | Xu ..................... H04N 21/8355 713/176 |
| 2016/0373821 | A1 * | 12/2016 | Nair .................. H04N 21/8456 |
| 2019/0364319 | A1 * | 11/2019 | Milford .............. H04N 21/8456 |
| 2020/0344307 | A1 * | 10/2020 | Livshits ........... H04N 21/25825 |
| 2020/0413130 | A1 * | 12/2020 | Yin .................... H04N 21/8456 |
| 2024/0040180 | A1 * | 2/2024 | Agrawal .......... H04N 21/25891 |

OTHER PUBLICATIONS

Written Opinion for PCT/US2021/070901, related to current application, mailed on Nov. 17, 2021, 4 pages.

Search Strategy for PCT/US2021/070901, related to current application, mailed on Nov. 17, 2021, 1 page.

"AWS Elemental MediaTailor User Guide," 158 pages. Downloaded May 6, 2020 from https://docs.aws.amazon.com/mediatailor/latest/ug/mediatailor-guide.pdf.

"How MediaTailor Works—AWS Elemental MediaTailor," 2 pages. Downloaded on May 6, 2020, https://docs.aws.amazon.com/mediatailor/latest/ug/what-is-flow.html.

"VOD Content Ad Behavior—AWS Elemental MediaTailor," 2 pages. Downloaded on May 6, 2020, https://docs.aws.amazon.com/mediatailor/latest/ug/ad-behavior-vod.html.

* cited by examiner

SYSTEMS AND METHODS FOR MIDSTREAM SELECTION OF CONTENT TO INSERT INTO A MEDIA STREAM

BACKGROUND

Technical Field

This application generally relates to systems and methods for selecting content to insert into a video on demand media stream, and more particularly to selecting such content after an index file for the stream has been delivered to the client.

Brief Description of the Related Art

Streaming media platforms are well known in the art. In such systems, generally a client application like a media player running on an end user device requests a stream from a server that has been identified as a source for the stream. The server responds with an index file, which identifies segments of the stream for the client application to fetch. For example, an index file may list a URI pointing to the stream content for the seconds 1 to 5 of a video, then a second URI for seconds 5 to 10, and so on. The client fetches each segment in turn, and plays it. This is referred to as segmented streaming. As also known in the art, different versions of each segment (e.g., at different bitrates) may be listed in the index file, so that the client player can decide which version to choose on a segment by segment basis, in light of network conditions and/or client buffer status. This is referred to as adaptive bitrate streaming.

There are a variety of different streaming formats and protocols that use index files. Index files is a generic term; such files are often referred to as manifests, or playlists, or otherwise, depending on the streaming standard. Examples include MPEG-DASH, HTTP Live Streaming (HLS), and HTTP Dynamic Streaming (HDS).

In a long-running stream, it is desirable to dynamically select, in the middle of the stream, content that should be served to a given client. In a live stream, this is fairly straightforward. Because new segments for a live stream are being created and delivered in real-time (or near real-time) as an event unfolds, the client periodically requests an updated index file in order to be able to request the newly created segments. Hence, the streaming platform can insert universal resource identifiers (URIs) to dynamically selected content before sending the new index file.

A live streaming workflow may proceed as follows. First, a client player makes a request for an index file (e.g., manifest, or playlist) to the streaming media platform for an updated index file. As known in the art, the platform may be embodied by a content delivery network (CDN) fronting an origin infrastructure, typically including an encoder. Hence, the client request is handled at a given CDN server (e.g. a proxy server), which fetches the updated index file (e.g., an .m3u8 playlist) for the live stream from the origin. The index file is examined to see if it contains markers indicating points in the stream (referred to as cue points) where content should be inserted (e.g., a CUE-OUT). Such content could include, for example, alternate media (e.g., alternative video scenes or audio tracks), personalized end-user information, or advertisements.

If there are no markers, then the index file can be delivered to the client as-is. If a marker is detected, then the platform initiates a process to select a piece of content to insert, and once the decision is made, it places the URI for that selected content segment into the index file at the cue point. The process and criteria for selecting the content may vary, but might include for example some out of band communication with the client, with a personalization module, or communication with an ad bidding/auction system (a demand side platform, for example). In the latter case, auction process, determine winning bids from bid responses, and stitch ad segments to the live index file before returning it to the player. The modified index file is then returned to the player.

In contrast to live streams, the situation is not so straightforward for content on demand streams (such as a video on demand, or VoD, stream). An on-demand index file may have one or more markers indicating cue points. Unlike the live index file, however, a client player typically requests the index file only once at the beginning of a stream. Running logic to determine which content to insert and then insert URIs to that content for all cue points is not acceptable, as it is likely to overload the streaming infrastructure, and increase the time to first byte (TTFB) for the stream, because all decisions have to be made before returning the index file to the client. Moreover, a viewer may not view the entire on-demand stream. Indeed a viewer might stop after only a few seconds, before many or all of the cue points, meaning such effort might be wasted. Finally, many on-demand index files do not contain any markers for cue points; manual insertion of such markers is cumbersome.

With the above by way of background, the teachings of this patent document provide improved systems and methods for selecting and inserting content into on-demand stream, after delivery of the index file to the client, and preferably shortly before the cue point is reached. These teachings improve the efficiency, responsiveness, function, and user experience of computer systems (namely, streaming media platforms delivering VoD content).

Those skilled in the art will understand these and other improvements from the teachings hereof.

The teachings hereof may be implemented in CDNs, which are known in the art. Hence, a brief overview of known CDN technology is now provided. Content delivery networks (CDNs) typically use proxy servers to improve the delivery of websites, web applications, and other online content such as streaming media. A CDN usually has many proxy servers distributed across the Internet, e.g., located in end user access networks, peering points, or otherwise. An end user client desiring content under a domain being handled by the CDN is directed to a given proxy server in the CDN. This may be accomplished using a DNS-based request routing mechanism, in which the CDN's domain name service returns an IP address of a proxy server in response to a name lookup for the domain, all as known in the art.

Due to the aforementioned request routing mechanism, the end-user client makes a content request for a desired object to the proxy server (e.g., using HTTP or other application layer protocol that may be used to facilitate an API). As relevant here, the object may be an index file, or may be a multimedia segment for a VoD stream. The proxy server maintains a cache of content (also referred to, equivalently, as an 'object' cache). The proxy server searches this cache for the content. If it locates an object and the object is not expired and otherwise valid to serve (cache hit), the end-user request can be served out of cache. If not (cache miss), the proxy server may need to fetch the object from another server in the CDN (e.g., using a cache hierarchy model, as described in U.S. Pat. No. 7,603,439), or from an origin server associated with the content provider that is associated with the domain of the requested content. In this way the content provider can make its stream (or its website, web application, enterprise tool, or other online property) available to end-users via the CDN in an improved fashion.

To fetch content from origin, the proxy server issues what is often referred to as a 'forward request' to the origin. After retrieving the content from origin, it can be served to the end-user client, and potentially cached for some time period by the proxy (e.g., as indicated by a time to live or TTL) to serve future requests.

Typical kinds of content that can be stored in a proxy's cache include, images, video segments, audio segments, scripts, markup language documents, JSON objects, and other things. Cached objects may also include content fetched from an origin database, such as product catalog, shipping records, inventory status, flight records, or any other kind of record.

More information about CDN technologies, including examples of request routing mechanisms using DNS and otherwise, as well as proxy server technologies, can be found in the following patent documents, the teachings of which are hereby incorporated by reference in their entirety: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

BRIEF SUMMARY

An index file for an on-demand media stream (such as video-on-demand) is analyzed to determine one or more content insertion points, also referred to as cue points. The streaming platform modifies the index file such that the streaming platform can select the content to insert later on, preferably making that selection after the index file has been served and preferably a short time before the cue point in the stream. Put another way, the decision as to which content to insert at such points is not predetermined at the time of serving the index file. In this way, content insertions decisions can be made midstream.

In one embodiment, a reference to a virtual media segment is inserted into the index file at each cue point. The reference is, for example, a universal resource identifier, URI. In addition, a special 'start decision process' marker is inserted into the index file, preferably at a point in the stream that is shortly before the virtual media segment is to appear. The length of the advance time is preferably configurable. The special marker indicates that the streaming platform should begin the process of determining what content to use for upcoming cue points. Hence, when the client player requests the URI with the special marker, the streaming platform will begin the server-side decision-making process. Subsequently, when the client player requests the virtual media segment(s) using the virtual URI(s) at the cue point, that decision-making process will have completed, and the streaming platform will be able to respond to the client promptly by serving the chosen content and/or a redirect to said content.

The streaming platform can take advantage of the advance time period not only to select the content to use at the cue point, but also to transcode or otherwise adapt its type and format based on the characteristics of the requesting client device, the stream type, or other contextual factors.

The teachings hereof improve the efficiency, flexibility and operation of on-demand streaming systems. They may be applied in a variety of use cases. For example, the content selected to insert in midstream may be alternate media (e.g., alternative video scenes or audio effects), personalized end-user information, advertisements to insert into an ad break, or other things, without limitation.

The foregoing has outlined some pertinent features of the teachings of this document, but they are not limiting. The claims define the scope of the invention captured by this patent document.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying components being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HLS, HDS, MPEG-DASH, HTML, URL, XML, AJAX, CSS, HTTP versions 1.1 and 2, HTTP over QUIC, MQTT, TCP/IP, and UDP, is assumed.

All references to HTTP should be interpreted to include an embodiment using encryption (HTTP/S), such as when TLS secured connections are established. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

The term media stream covers any form of media, or multimedia, such as video, audio, graphics/text, individually, or packaged, unless explicitly denoted as a stream carrying a single form of media. The term universal resource identifier (URI) includes without limitation universal resource locators (URL).

With the foregoing by way of introduction, the teachings hereof are now presented in more detail.

In one embodiment, a workflow for midstream content selection and insertion works as follows. First, a client player sends a request for an index file to a server. That server is typically an HTTP server, such as an HTTP proxy server in a commercial CDN. Without loss of generality, for convenience the server will be referred to hereinafter as the HTTP server.

The HTTP server can retrieve the index file, e.g., from local storage or by issuing a forward request for the index file to an origin server associated with a content provider of the desired media stream. The HTTP server sends the index file to a node that manages server-side content insertion (SSCI), referred to herein as the SSCI node, which may be running on the same machine as a HTTP server or not. The SSCI node looks up a content insertion policy associated with the stream to determine cue points. The policy decision may be based on settings for the stream, the stream's content provider and/or the client player, the client connection type or speed, or other factors. The cue points are points at which content can be inserted into the stream (e.g., pre-roll, mid-roll, certain times, etc.). The actual content will be selected later.

The SSCI node generates a modified index file, adding virtual segment URIs at cue points and special "start decision process" markers. The virtual URIs are "virtual" because they are not associated with an actual, specific piece of content when written into the index file. The special markers are used to trigger the content selection process so as to choose the specific content that will be associated with a virtual URI. Hence the special markers are associated with a corresponding cue point identified with a label, e.g., cue_pointID=1. The cue point is sometimes referred to as a break, e.g., break_ID=1, particularly in the online advertising context. The special marker may be embedded in the query string of the URI of a media segment prior to the cue point. The special markers are embedded into the stream such that they are preferably encountered by the client player in advance of the virtual segment URI, e.g., preferably at least 30 seconds beforehand, or other configured value, so long as the value is large enough so that the server-side process to associate content with the virtual URI (e.g., generating and selecting the content, for example) can be finished by the time the player needs it. The virtual URI preferably contains a hostname that points to the SSCI node as the source for its content instead of the HTTP server, although this is not limiting (e.g., the URI could point to the HTTP server in some embodiments, or a data store).

The modified index file is returned to the client player by the HTTP server. Using conventional segmented HTTP streaming techniques, the client player starts to download the segments (e.g., the TS segments) of the media stream and begins to play them, as it would with any other media-on-demand index file. When the client player reaches and requests via HTTP GET the URI that has the special "start decision process" marker in its query string, a configuration in the HTTP server detects the presence of this parameter and sends a message request to the SSCI node. The message contains necessary information for the SSCI node to initiate a decision-making process to determine what content (now that the viewer has reached this spot in the stream) should be inserted into the stream at the upcoming cue point.

Upon receiving the message, the SSCI node will start the decision-making process, determine the content to use, and as necessary send the selected content to a transcoding and/or packaging process to be converted to match the target media stream and client player. For example, in a multimedia stream, the SSCI node might send a selected video segment and start the repackaging process to convert mp4 to TS.

Upon completion, the transcoding/packaging process will respond to the SSCI node with a message that indicates the location of the transcoded/repackaged content in associated storage.

The SSCI node then can construct a content mapping table that maps the cue point ID to the selected and transcoded/repackaged content, and caches it in memory.

When the client player reaches the cue point and requests the virtual URI using an HTTP GET, the virtual URI resolves to point to the SSCI node directly (or alternatively to the HTTP server, which passes it to the SSCI node). The SSCI node will read the virtual URI, and more specifically read the cue point ID in the virtual URI and map it to the previously selected and prepared content for such cue point ID. The SSCI can then provide that content (basically a segment of the stream) to the client in any of several ways. For example, it can redirect the client player to the segment, or fetch the content itself and serve it. Either way, the client receives the segment and plays it at the cue point, then returns to the "regular" content in the stream as indicated by the index file.

Below is an excerpt of a sample index file that has been modified by the SSCI node as described above to contain virtual URIs and the special "start decision process" marker, both of which are shown in boldface. This excerpt relates to a segment being inserted into the middle of a video on demand multimedia stream, with such segment being selected in real-time after the index file for the stream is served to the client player. The URI in line 6 includes the special marker in the form of a URL parameter called "special marker=1". When the client requests this URI from the streaming platform, the HTTP server will detect this parameter and send it to the SSCI, which then begins the decision-making process for the cue point of CuePointID=break_1. At the same time HTTP server will also send the SSCI node client information (e.g., HTTP headers, cookies, etc.) as needed to conduct the decision-making.

Example of Modified Index File—Excerpt

1 #EXTINF:5.000,
2   https://akamaihd.net/i/2020/03/foo.mp4.csmil/segment16_2_av.ts
3 #EXTINF:5.000,
4   https://akamaihd.net/i/2020/03/foo.mp4.csmil/segment17_2_av.ts
5 #EXTINF:5.000,
6   https://abp-ae.akamaized.net/dsm:foobar/i/2020/3/foo.mp4.csmil/segment18_2_av.ts? sessionId=foobar&CuePointID=break_1&breakDur=15&special_marker=1
7 #EXTINF:5.000,
8   https://akamaihd.net/i/2020/03/foo.mp4.csmil/segment19_2_av.ts
9 #EXTINF:5.000,
10  https://akamaihd.net/i/2020/03/foo.mp4.csmil/segment20_2_av.ts
11 #EXTINF:5.000,
12  https://akamaihd.net/i/2020/03/foo.mp4.csmil/segment21_2_av.ts
13 #EXTINF:5.000,
14  https://akamaihd.net/i/2020/03/foo.mp4.csmil/segment22_2_av.ts
15 #EXTINF:5.000,
16  https://abplive-vh.akamaihd.net/i/2020/03/foo.mp4.csmil/segment23_2_av.ts
17 #EXTINF:5.000,
18  https://abplive-vh.akamaihd.net/i/2020/03/foo.mp4.csmil/segment24_2_av.ts
19 #EXT-X-DISCONTINUITY
20 #EXTINF:5.000
21  https://abp-core-proxy.headerbidding.akadns.net/redirect/ad.ts?sessionId=foobar& breakDur=15&CuePointID=break_1 &adUnitNo=0&SegNo=0
22 #EXTINF:5.000
23  https://abp-core-proxy.headerbidding.akadns.net/redirect/ad.ts?sessionId=foobar& breakDur=15&CuePointID=break_1 &adUnitNo=0&SegNo=1
24 #EXTINF:5.000
25  https://abp-core-proxy.headerbidding.akadns.net/redirect/ad.ts?sessionId=foobar &breakDur=15&CuePointID=break_1 &adUnitNo=0&SegNo=2
26 #EXTINF:5.000,
27  https://akamaihd.net/i/2020/03/foo.mp4.csmil/segment25_2_av.ts
28 #EXTINF:5.000,
29  https://akamaihd.net/i/2020/03/foo.mp4.csmil/segment26_2_av.ts
. . .

Note that the URI containing the special marker, line 6, may be a segment of the regular media stream being played, that is, the marker can be appended or otherwise incorporated into the URI for a given segment of the stream. The URI may point to the same hostname as the rest of the stream segments, or an alternative hostname (such as one pointing to the SSCI) that is for handling URIs with markers.

Returning to the sample index file, lines 21, 23 and 25 are three virtual URIs representing three segments for presentation at the "break_1" CuePointID. The three segments could be three different pieces of content or a single, longer item. This also indicates that the teachings hereof are not limited to selecting and inserting one item; in fact many could be inserted.

In one use case, the CuePointID of "break_1" is an advertising break in the multimedia stream, and the three segments are three advertisements. The decision-making process to determine which ads to provide can be an online advertising auction as known in the art, i.e., a bidding process initiated by the special marker in line 6. The special marker thus indicates that such an auction should begin.

FIGS. 1A to 1G are detailed sequence diagrams that illustrate the message flow in a multimedia streaming platform, in accord with teachings hereof. The embodiment illustrated in FIGS. 1A to 1G leverage the teachings hereof to select advertising segments to serve to a requesting client 100 in the middle of an on demand multimedia stream.

Figure 1A:
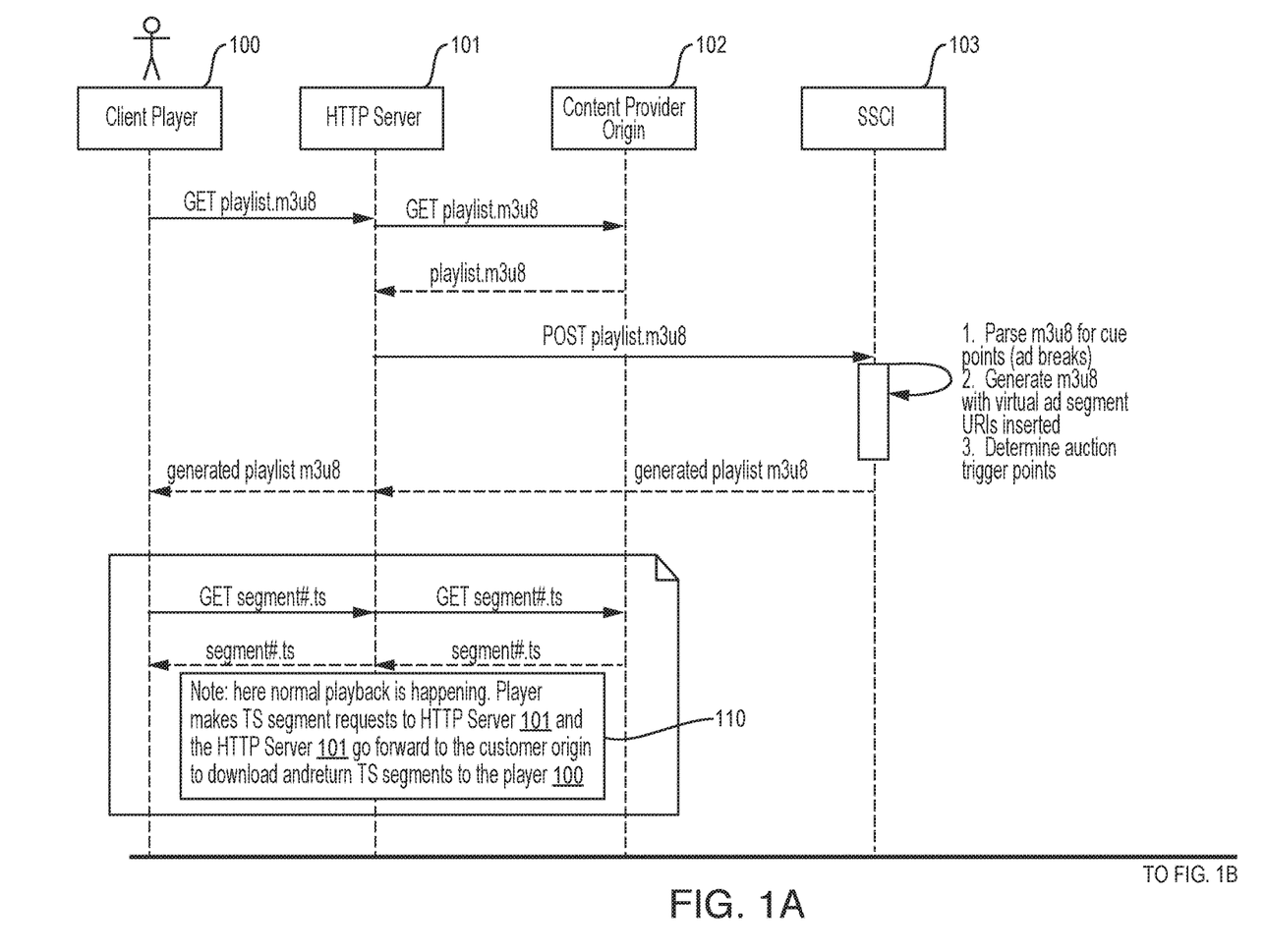
FIG. 1A is a message sequence diagram illustrating the flow of messages in a media streaming platform, in one embodiment, in the context of real-time advertisement selection and insertion.

FIG. 1A

The client player 100 sends an HTTP GET request to the HTTP server 101 for an index file to the multimedia stream desired by the end user. Here the index file is an .m3u8 file titled "playlist.m3u8". Assume the index file has not been requested before and therefore does not reside in local cache at the HTTP server 101. The HTTP server issues a forward GET request to an origin server associated with the content provider for the multimedia stream (the content provider origin 102, or origin 102 for short). The origin 102 responds with the index file "playlist.m3u8". The HTTP server 101 then issues an HTTP POST, sending the index file to the SSCI 103. Note that in this embodiment, the inserted content will be one or more advertisement segments, and accordingly the SSCI node 103 can equivalently be referred to as a server-side-ad-insertion node (SSAI).

The SSCI 103 parses the index file for cue points and modifies it in the manner previously described in this patent document, executing the three steps 1, 2, 3 shown in FIG. 1A. The SSCI 103 returns the modified index file ("generated playlist.m3u8") to the HTTP server 101, which serves it to the client player 100.

The next set of messages are shown in box 110. These messages represent normal, conventional playback of multimedia segments. In this case the segments are TS segments. Although only one request and response cycle is shown, the process may be repeated for any number of multimedia segments as the stream is played.

Figure 1B:
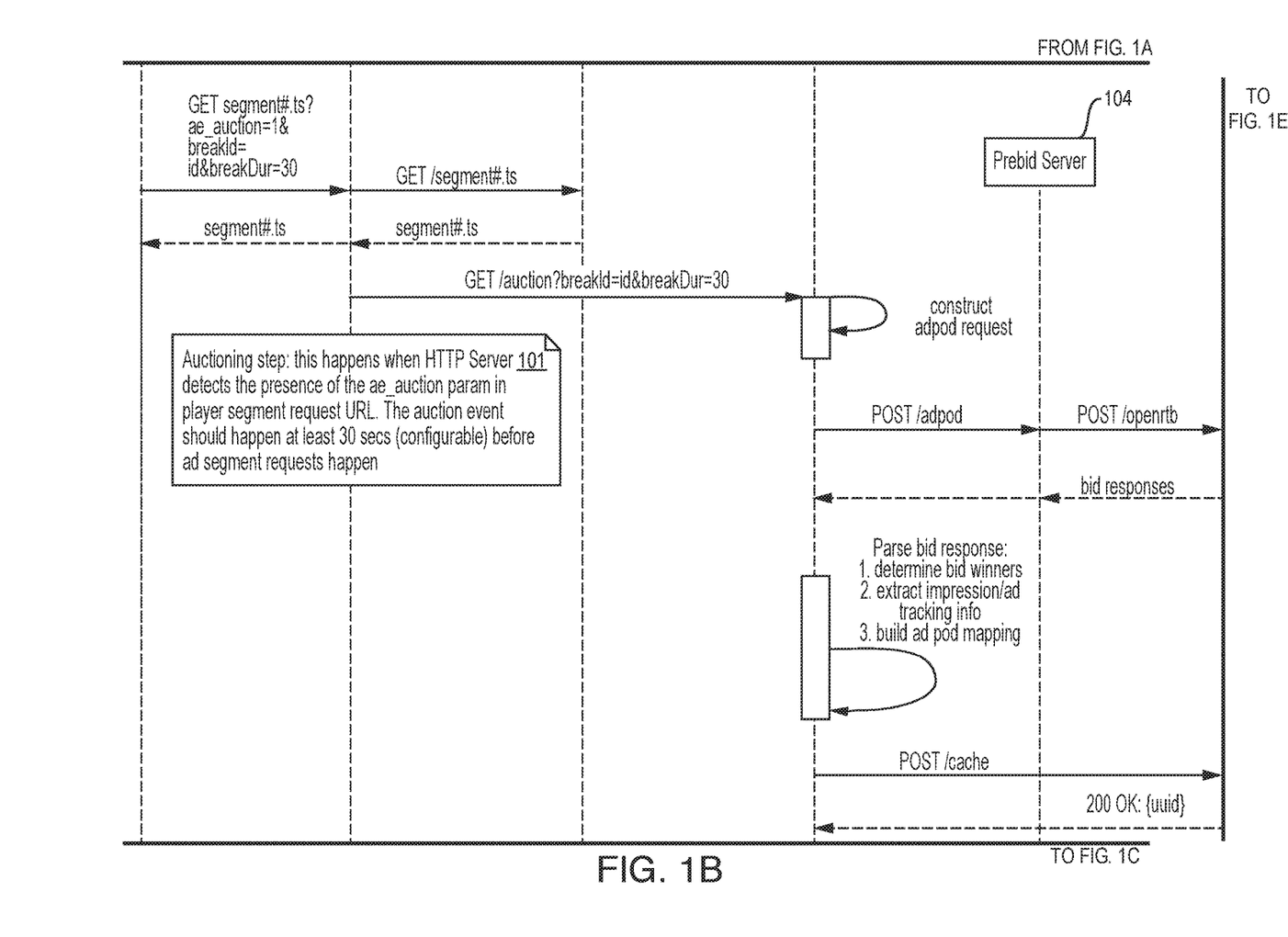
FIG. 1B is a continuation of the message sequence diagram of FIG. 1A illustrating the flow of messages in a media streaming platform, in one embodiment, in the context of real-time advertisement selection and insertion.

FIG. 1B

At some point in the stream, the client player 100 issues an HTTP GET request for a segment in the multimedia stream that contains the special auction marker. Put another way, this GET request is directed to the URI in the index file that contains the special marker. The HTTP server 101 receives this request and issues a forward request to the content provider origin 102 for the segment. When the segment is returned, the HTTP server 101 serves it to the client player 100. However, as indicated in the "auctioning step" box, the HTTP server 101 detects the presence of the marker and because of that issues an HTTP GET message with URL parameters describing the upcoming ad break ("GET/auction?breakID=id&breakDur=30"). This message may also include or append information about the client player 100. This HTTP message is sent to the SSCI 103.

The SSCI 103 uses such information to initiate a bidding process to obtain an advertisement(s) to insert into the upcoming ad break. To this end, the SSCI 103 constructs an 'adpod' request based on the information in the HTTP server's 101 message.

The SSCI 103 node sends an HTTP POST ("POST/adpod") with the adpod data to a prebid server 104, which handles the process of soliciting bids ("POST/openrtb") with participating supply side platforms (SSPs) and demand side platforms (DSPs), in a manner known in the art. The POST and bid responses to SSPs/DSPs 106 are shown on FIG. 1E.

Returning to FIG. 1B, the bid responses are returned to the prebid server 104 and then to the SSCI 103, which determines the winning bid. The SSCI 103 builds a mapping between the breakID, the adpod, and the winning bid response, as represented by its VAST wrapper. The VAST wrapper(s) for the winning bid can be stored in the VAST cache 105 (shown by POST/cache going to VAST Cache 105 on FIG. 1E, with response HTTP 2000K). VAST responses and wrappers are known in the art. In some cases, the VAST wrappers can be collapsed or optimized and this optimized form stored in a VAST cache 105 for efficient reuse.

Figure 1C:
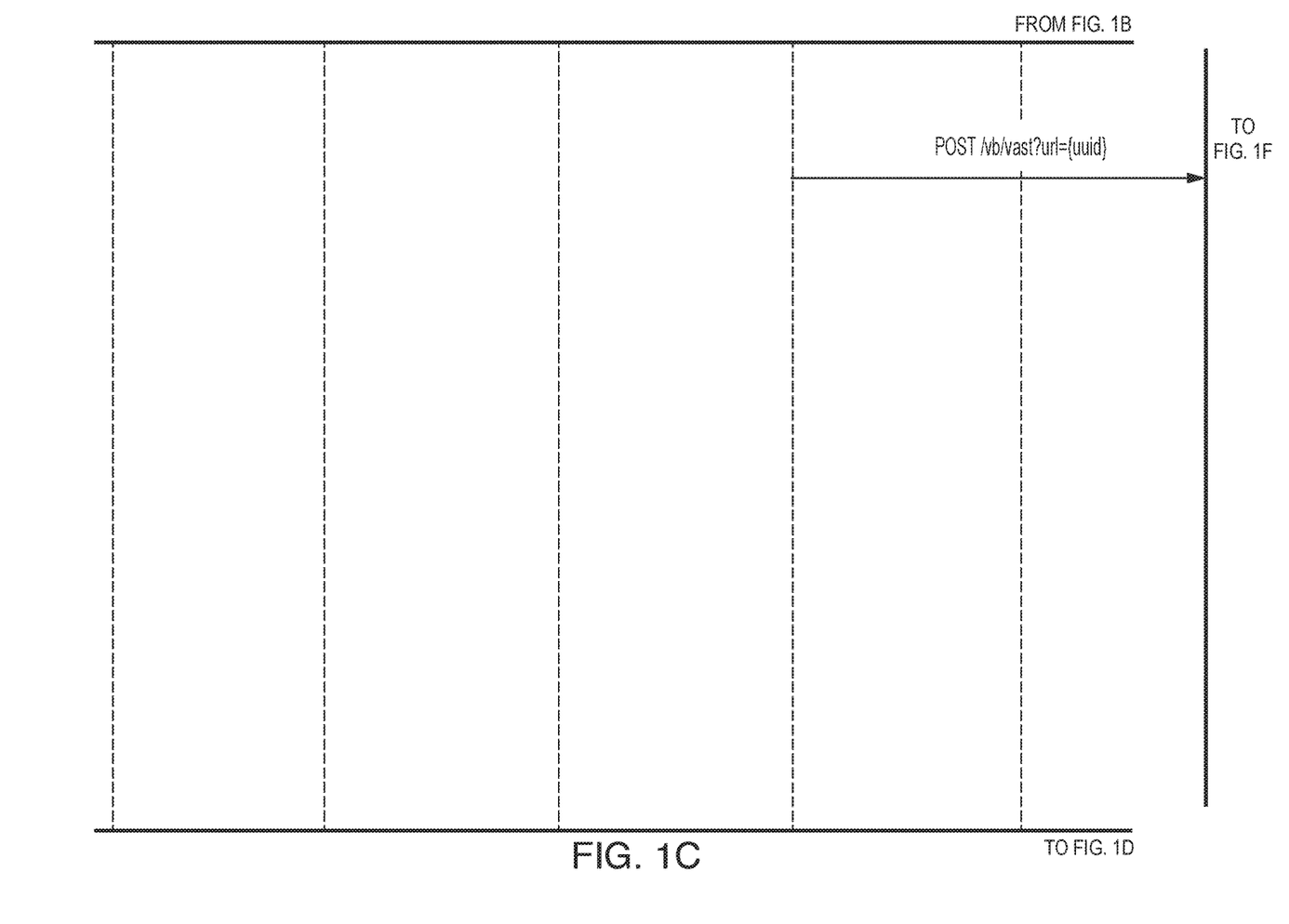
FIG. 1C is a continuation of the message sequence diagram of FIG. 1B illustrating the flow of messages in a media streaming platform, in one embodiment, in the context of real-time advertisement selection and insertion.

FIG. 1C

The SSCI 103 must now ensure that the selected advertisement(s) are in the proper format to be inserted into the multimedia stream. To this end, the SSCI 103 uses an HTTP POST to send the winning bid response (that is, its VAST wrapper) to a transcoding and storage function, named the TS packager/Ad Origin 107. This is shown by POST /vb/vast?url={uuid} on FIG. 1C, which continues on to FIG. 1F.

Figure 1D:
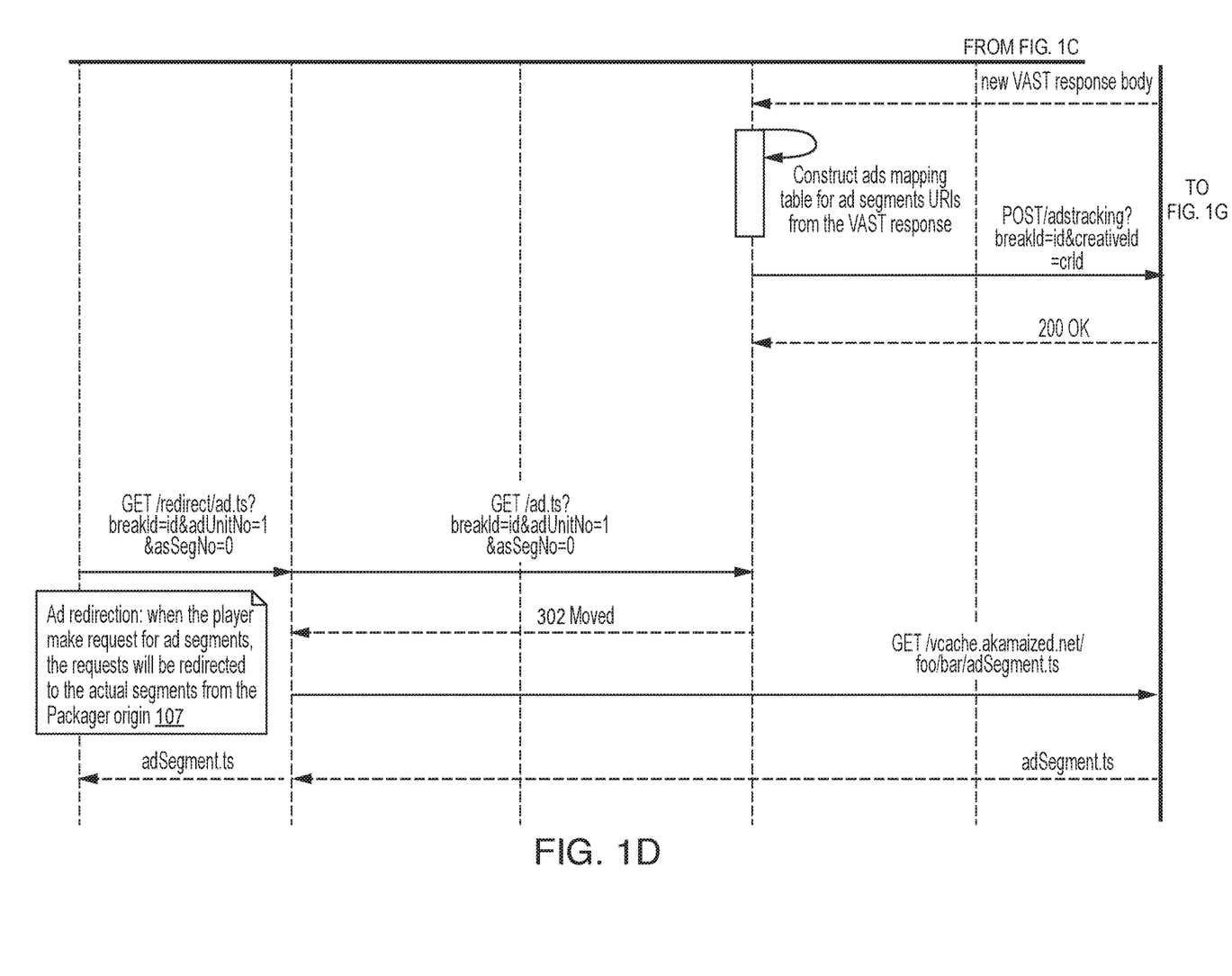
FIG. 1D is a continuation of the message sequence diagram of FIG. 1C illustrating the flow of messages in a media streaming platform, in one embodiment, in the context of real-time advertisement selection and insertion.
Figure 1E:
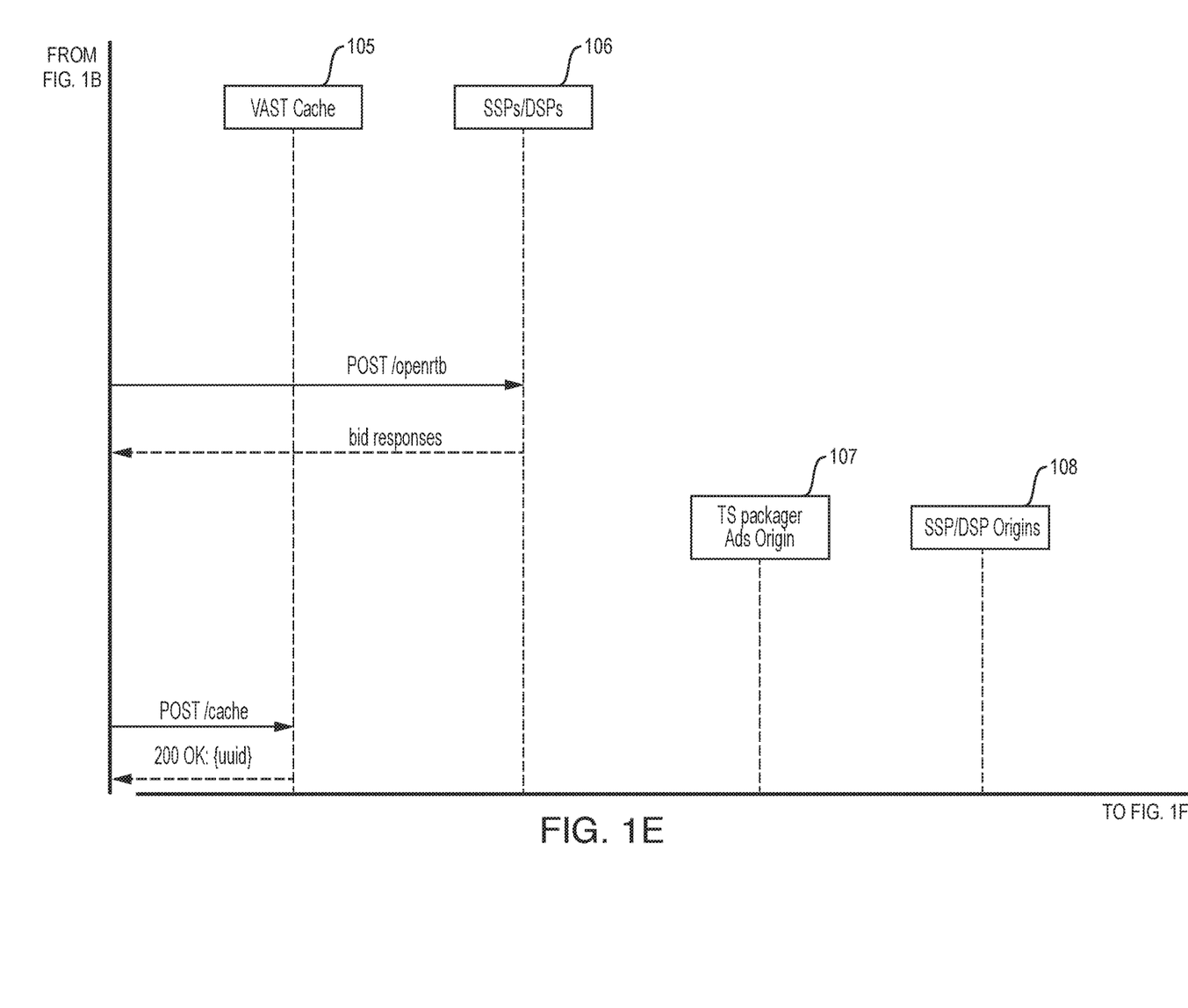
FIG. 1E is a continuation of the message sequence diagram of FIG. 1B illustrating the flow of messages in a media streaming platform, in one embodiment, in the context of real-time advertisement selection and insertion.
Figure 1F:
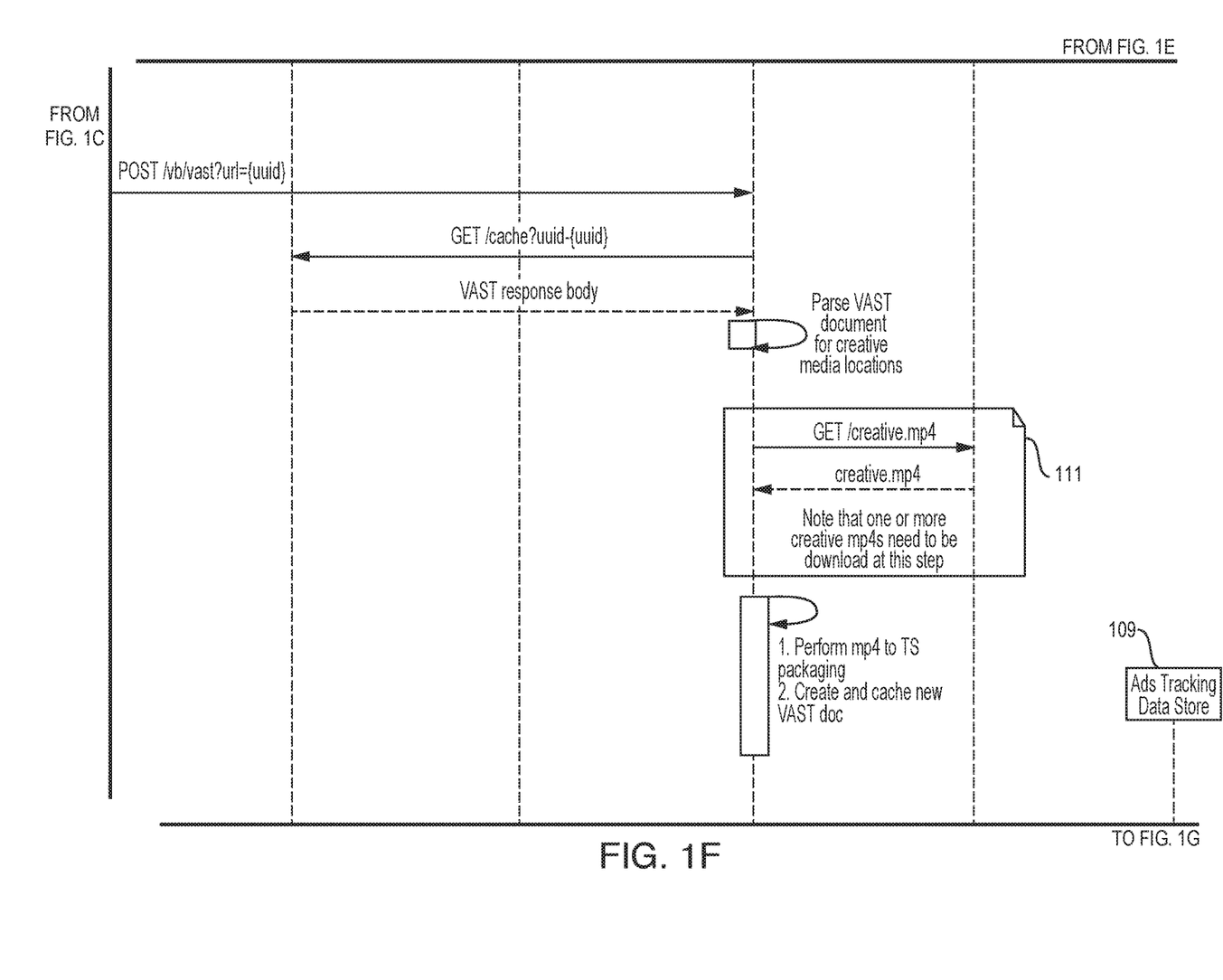
FIG. 1F is a continuation of the message sequence diagram of FIG. 1C illustrating the flow of messages in a media streaming platform, in one embodiment, in the context of real-time advertisement selection and insertion.

Continuing on FIG. 1F, the TS packager/Ad Origin 107 obtains the VAST response body (document) from the cache 105, and then parses the VAST document to obtain the URI for the winning ad creative. As shown in the box 111 (beginning with "GET /creative.mp4") it then fetches the creative from the appropriate locations in the SSP/DSP ecosystem 108, and re-packages and/or transcodes it as needed for the target multimedia stream. In this example, an mp4 file is obtained and mp4 to TS packaging. The advertisement is stored at the TS packager/Ad Origin 107.

Continuing on FIG. 1F, the TS packager/Ad Origin 107 creates and caches a new VAST document that points to the location of the repackaged/transcoded creative on the TS packager/Ad Origin 107.

Figure 1G:
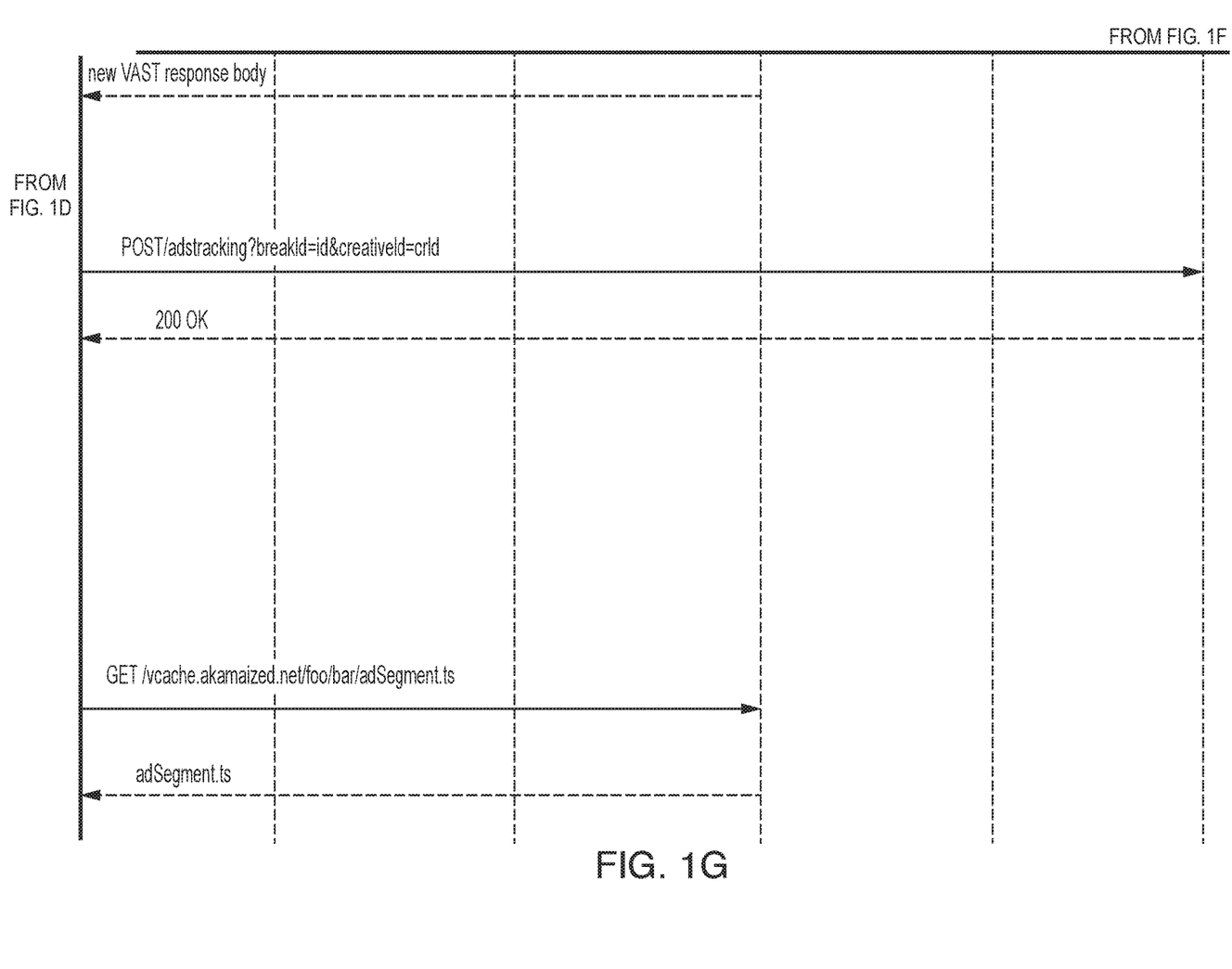
FIG. 1G is a continuation of the message sequence diagram of FIG. 1D illustrating the flow of messages in a media streaming platform, in one embodiment, in the context of real-time advertisement selection and insertion.

Moving to FIG. 1G, the TS packager/Ad Origin 107 returns the new VAST document to the SSCI 103 ("new VAST response body" message on FIG. 1G going to FIG. 1D).

Moving to FIG. 1D, the SSCI 103 then updates its mapping table so that the ad break is mapped to the ad creative that is located on the TS packager/Ad Origin 107 ("Construct ads mapping table for ad segments URIs from the VAST response.") Finally, the SSCI 103 uses an HTTP POST ("POST/adstracking?breakId=id&creativeId=crId") to send ad tracking and reporting data to the Ad Tracking Data Store 109 (shown on FIG. 1G, with return message "200 OK" back to FIG. 1D).

At this point, on FIG. 1D, the client player 100 playing the multimedia stream reaches the virtual URI in the index file, causing it to issue an HTTP GET request for the ad segment to the HTTP server 101 ("GET/redirect/ad.ts?breakId=id&adUnitNo=1&asSegNo=0"). The HTTP server 101 recognizes this as a virtual URI request and therefore forwards it to the SSCI 103. In this embodiment, the SSCI 103 responds with an HTTP redirect ("302 Moved") to the URI location of the repackaged winning ad, which is on the TS packager/Ad Origin 107. The "ad redirection" box explains this action. The HTTP server 101 issues a GET request to the URI included in the 302 response, as shown by the message "GET /vcache.akamaized.net/foo/bar/adSegment.ts", which continues on to FIG. 1G to 107. The TS segment is returned back from 107 to the HTTP Server 101 (going from FIG. 1G to 1D) and then to the client 100, so the client is able to play it.

This ends the description of FIGS. 1A-1G.

Provided below is an example index file (manifest) in original format, followed by a version modified in accord with the teachings hereof to include virtual URIs, as well as a special auction trigger "ae_auction=1" to begin an auction process.

Original Index File—with ad marker #EXT-X-CUE:DURATION="60", ID="break1"

```
#EXTM3U
#EXT-X-TARGETDURATION:10
#EXT-X-ALLOW-CACHE:YES
#EXT-X-PLAYLIST-TYPE:VOD
#EXT-X-VERSION:5
#EXT-X-MEDIA-SEQUENCE:1
#EXTINF:10.000,
segment1_3_av.ts
#EXTINF:10.000,
segment2_3_av.ts
#EXTINF:10.000,
segment3_3_av.ts
#EXTINF:10.000,
segment4_3_av.ts
#EXTINF:10.000,
segment5_3_av.ts
#EXTINF:10.000,
segment6_3_av.ts
#EXT-X-CUE:DURATION="60",ID="break1"
#EXTINF:10.000,
segment7_3_av.ts
#EXTINF:10.000,
segment8_3_av.ts
#EXTINF:10.000,
segment9_3_av.ts
#EXTINF:10.000,
segment10_3_av.ts
#EXTINF:10.000,
segment11_3_av.ts
#EXTINF:10.000,
segment12_3_av.ts
#EXTINF:10.000,
segment13_3_av.ts
EXTINF:10.000,
segment14_3_av.ts
#EXTINF:10.000,
segment15_3_av.ts
#EXTINF:10.000,
segment16_3_av.ts
#EXTINF:10.000,
segment17_3_av.ts
#EXTINF:10.000,
segment18_3_av.ts
#EXT-X-ENDLIST
```

Modified Index File—with inserted auction trigger "ae_auction=1" and with virtual URIs inserted between the markers #EXT-X-DISCONTINUITY

```
#EXTM3U
#EXT-X-TARGETDURATION:10
#EXT-X-ALLOW-CACHE:YES
#EXT-X-PLAYLIST-TYPE:VOD
#EXT-X-VERSION:5
#EXT-X-MEDIA-SEQUENCE:1
#EXTINF:10.000,
segment1_3_av.ts
#EXTINF:10.000,
segment2_3_av.ts
#EXTINF:10.000,
segment3_3_av.ts?breakId=break1&breakDur=60&bitrate=0&ae_auction=1
#EXTINF:10.000,
segment4_3_av.ts
#EXTINF:10.000,
segment5_3_av.ts
#EXTINF:10.000,
segment6_3_av.ts
#EXT-X-DISCONTINUITY
#EXTINF:5.000
/dsm:ded3ed4c-de13-47e0-ad46-2a426d947851/ak-fo/proxy-
dev.headerbidding.akadns.net/redirect/ad_0_
0.ts?breakDur=60&breakId=break1&bitrate
=0&adUnitNo=0&adSegNo=0
#EXTINF:5.000
/dsm:ded3ed4c-de13-47e0-ad46-2a426d947851/ak-fo/proxy-
dev.headerbidding.akadns.net/redirect/ad_0_
1.ts?breakDur=60&breakId=break1&bitrate
=0&adUnitNo=0&adSegNo=1
#EXTINF:5.000
/dsm:ded3ed4c-de13-47e0-ad46-2a426d947851/ak-fo/proxy-
dev.headerbidding.akadns.net/redirect/ad_0_
2.ts?breakDur=60&breakId=break1&bitrate
=0&adUnitNo=0&adSegNo=2
#EXT-X-DISCONTINUITY
#EXTINF:5.000
/dsm:ded3ed4c-de13-47e0-ad46-2a426d947851/ak-fo/proxy-
dev.headerbidding.akadns.net/redirect/ad_1_
0.ts?breakDur=60&breakId=break1&bitrate
=0&adUnitNo=1&adSegNo=0
#EXTINF:5.000
/dsm:ded3ed4c-de13-47e0-ad46-2a426d947851/ak-fo/proxy-
dev.headerbidding.akadns.net/redirect/ad_1_
1.ts?breakDur=60&breakId=break1&bitrate
=0&adUnitNo=1&adSegNo=1
#EXTINF:5.000
/dsm:ded3ed4c-de13-47e0-ad46-2a426d947851/ak-fo/proxy-
dev.headerbidding.akadns.net/redirect/ad_1_
2.ts?breakDur=60&breakId=break1&bitrate
=0&adUnitNo=1&adSegNo=2
#EXT-X-DISCONTINUITY
#EXTINF:5.000
/dsm:ded3ed4c-de13-47e0-ad46-2a426d947851/ak-fo/proxy-
dev.headerbidding.akadns.net/redirect/ad_2_
0.ts?breakDur=60&breakId=break1&bitrate
=0&adUnitNo=2&adSegNo=0
#EXTINF:5.000
/dsm:ded3ed4c-de3-47e0-ad46-2a426d947851/ak-fo/proxy-
dev.headerbidding.akadns.net/redirect/ad_2_
1.ts?breakDur=60&breakId=break1&bitrate
=0&adUnitNo=2&adSegNo=1
#EXTINF:5.000
/dsm:ded3ed4c-de13-47e0-ad46-2a426d947851/ak-fo/proxy-
dev.headerbidding.akadns.net/redirect/ad_2_
2.ts?breakDur=60&breakId=break1&bitrate
=0&adUnitNo=2&adSegNo=2
#EXT-X-DISCONTINUITY
#EXTINF:5.000
/dsm:ded3ed4c-de1-47e0-ad46-2a426d947851/ak-fo/proxy-
dev.headerbidding.akadns.net/redirect/ad_3_
0.ts?breakDur=60&breakId=break1&bitrate
=0&adUnitNo=3&adSegNo=0
#EXTINF:5.000
/dsm:ded3ed4c-de13-47e0-ad46-2a426d947851/ak-fo/proxy-
dev.headerbidding.akadns.net/redirect/ad_3_
1.ts?breakDur=60&breakId=break1&bitrate
=0&adUnitNo=3&adSegNo=1
#EXTINF:5.000
/dsm:ded3ed4c-de13-47e0-ad46-2a426d947851/ak-fo/proxy-
dev.headerbidding.akadns.net/redirect/ad_3_
2.ts?breakDur=60&breakId=break1&bitrate
=0&adUnitNo=3&adSegNo=2
#EXT-X-DISCONTINUITY
```

```
#EXTINF:10.000,
segment7_3_av.ts
#EXTINF:10.000,
segment8_3_av.ts
#EXTINF:10.000,
segment9_3_av.ts
#EXTINF:10.000,
segment10_3_av.ts
#EXTINF:10.000,
segment11_3_av.ts
#EXTINF:10.000,
segment12_3_av.ts
#EXTINF:10.000,
segment13_3_av.ts
EXTINF:10.000,
segment14_3_av.ts
#EXTINF:10.000,
segment15_3_av.ts
#EXTINF:10.000,
segment16_3_av.ts
#EXTINF:10.000,
segment17_3_av.ts
#EXTINF:10.000,
segment18_3_av.ts
#EXT-X-ENDLIST
```

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 2:
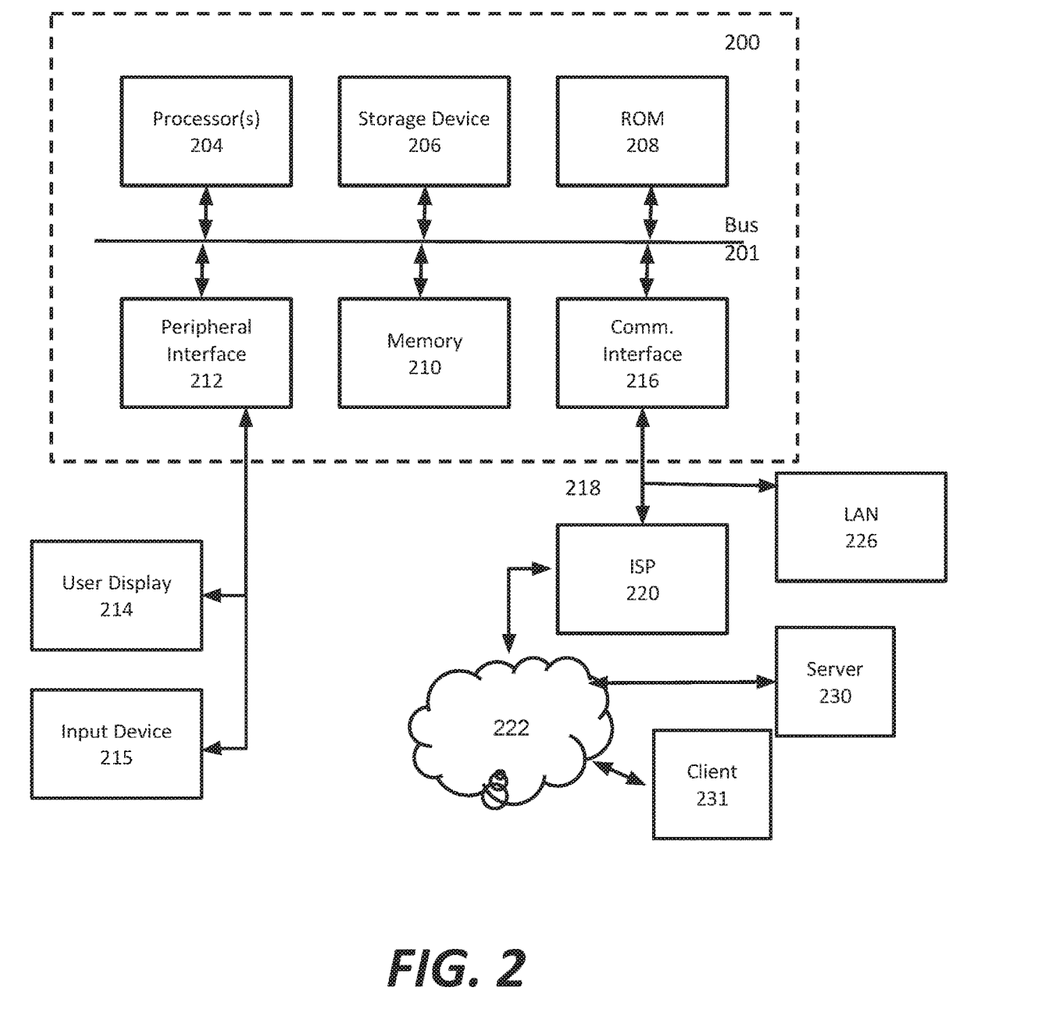
FIG. 2 is a block diagram illustrating hardware in a computer system that may be used to implement the teachings hereof.

FIG. 2 is a block diagram that illustrates hardware in a computer system 200 upon which such software may run in order to implement embodiments of the invention. The computer system 200 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 200 includes a microprocessor 204 coupled to bus 201. In some systems, multiple processor and/or processor cores may be employed. Computer system 200 further includes a main memory 210, such as a random access memory (RAM) or other storage device, coupled to the bus 201 for storing information and instructions to be executed by processor 204. A read only memory (ROM) 208 is coupled to the bus 201 for storing information and instructions for processor 204. A non-volatile storage device 206, such as a magnetic disk, solid state memory (e.g., flash memory), or optical disk, is provided and coupled to bus 201 for storing information and instructions. Other application-specific integrated circuits (ASICs), field programmable gate arrays (FPGAs) or circuitry may be included in the computer system 200 to perform functions described herein.

A peripheral interface 212 may be provided to communicatively couple computer system 200 to a user display 214 that displays the output of software executing on the computer system, and an input device 215 (e.g., a keyboard, mouse, trackpad, touchscreen) that communicates user input and instructions to the computer system 200. However, in many embodiments, a computer system 200 may not have a user interface beyond a network port, e.g., in the case of a server in a rack. The peripheral interface 212 may include interface circuitry, control and/or level-shifting logic for local buses such as RS-485, Universal Serial Bus (USB), IEEE 1394, or other communication links.

Computer system 200 is coupled to a communication interface 216 that provides a link (e.g., at a physical layer, data link layer) between the system bus 201 and an external communication link. The communication interface 216 provides a network link 218. The communication interface 216 may represent an Ethernet or other network interface card (NIC), a wireless interface, modem, an optical interface, or other kind of input/output interface.

Network link 218 provides data communication through one or more networks to other devices. Such devices include other computer systems that are part of a local area network (LAN) 226. Furthermore, the network link 218 provides a link, via an internet service provider (ISP) 220, to the Internet 222. In turn, the Internet 222 may provide a link to other computing systems such as a remote server 230 and/or a remote client 231. Network link 218 and such networks may transmit data using packet-switched, circuit-switched, or other data-transmission approaches.

In operation, the computer system 200 may implement the functionality described herein as a result of the processor executing code. Such code may be read from or stored on a non-transitory computer-readable medium, such as memory 210, ROM 208, or storage device 206. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 218 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method for determining content to insert into a media stream, the method comprising:
   a. generating an index file for a media stream, the index file including:
      (i) a plurality of universal resource identifiers (URIs) for media segments forming the media stream,
      (ii) a virtual URI unassociated with content when the index file is generated, and,
      (iii) a marker associated with the virtual URI such that the marker is requested by clients before the virtual URI in the media stream;
   b. serving the index file to a client player, responsive to a request from the client player;
   c. after serving the index file to the client player, and responsive to a message from the client player initiated upon reaching the marker in the index file, initiating a server-side process for determining what content to associate with the virtual URI;
   d. as a result of the server-side process, associating content with the virtual URI, the associated content comprising content for insertion into the media stream; and,
   e. responsive to a request from the client player for the virtual URI associated with the marker in the index file, performing any of: serving the associated content to the client player, and, redirecting the client player to the associated content.

2. The method of claim 1, wherein the associated content comprises a media segment.

3. The method of claim 1, wherein media stream is a multimedia stream.

4. The method of claim 1, wherein the media stream is a video-on-demand stream.

5. The method of claim 1, wherein generating the index file comprises: fetching an original index file and modifying the original index file by adding the virtual URI and the marker.

6. The method of claim 1, wherein the associated content is an advertisement.

7. The method of claim 1, wherein the server-side process comprises an online advertising bidding process.

8. A system that dynamically determines content to insert into a media stream, the system comprising:
   a plurality of servers, each having circuitry forming at least one processor and memory holding computer program instructions for execution on at least one processor for operating the respective server;
   the plurality of servers including one or more servers that:
   a. generates an index file for a media stream, the index file including:
      (i) a plurality of universal resource identifiers (URIs) for media segments forming the media stream,
      (ii) a virtual URI unassociated with content when the index file is generated, and,
      (iii) adding a marker associated with the virtual URI such that the marker is requested by clients before the virtual URI in the media stream;
   b. serves the index file to a client player, responsive to a request from said client player;
   c. after serving the index file to the client player, and responsive to a message from the client player initiated upon reaching the marker in the index file, initiates a server-side process for determining what content to associate with the virtual URI;
   d. as a result of the server-side process, associates content with the virtual URI, the associated content comprising content to insert into the media stream; and,
   e. responsive to a request from the client player for the virtual URI associated with the marker in the index file, performs any of: serves the associated content to the client player, and, redirects the client player to the associated content.

9. The system of claim 8, wherein the one or more servers comprises a proxy server.

10. The system of claim 8, wherein the associated content comprises a media segment.

11. The system of claim 8, wherein media stream comprises a multimedia stream.

12. The system of claim 8, wherein the media stream is a video-on-demand stream.

13. The system of claim 8, wherein generating the index file comprises: fetching an original index file from an origin server in proxy operation, and modifying the original index file by adding the virtual URI and the marker.

14. The system of claim 8, wherein the associated content comprises an advertisement.

15. The system of claim 8, wherein the server-side process comprises an online advertising bidding process.

16. A non-transitory computer readable medium storing instructions for execution on one or more hardware processors, the stored instructions comprising instructions for:
   a. generating an index file for a media stream, the index file including:
      (i) a plurality of universal resource identifiers (URIs) for media segments forming the media stream,
      (ii) a virtual URI unassociated with content when the index file is generated, and,
      (iii) a marker associated with the virtual URI such that the marker is requested by clients before the virtual URI in the media stream;

b. serving the index file to a client player, responsive to a request from the client player;
c. after serving the index file to the client player, and responsive to a message from the client player initiated upon reaching the marker in the index file, initiating a server-side process for determining what content to associate with the virtual URI;
d. as a result of the server-side process, associating content with the virtual URI, the associated content comprising content for insertion into the media stream; and,
e. responsive to a request from the client player for the virtual URI associated with the marker in the index file, performing any of: serving the associated content to the client player, and, redirecting the client player to the associated content.

\* \* \* \* \*